United States Patent Office 3,240,288
Patented Mar. 15, 1966

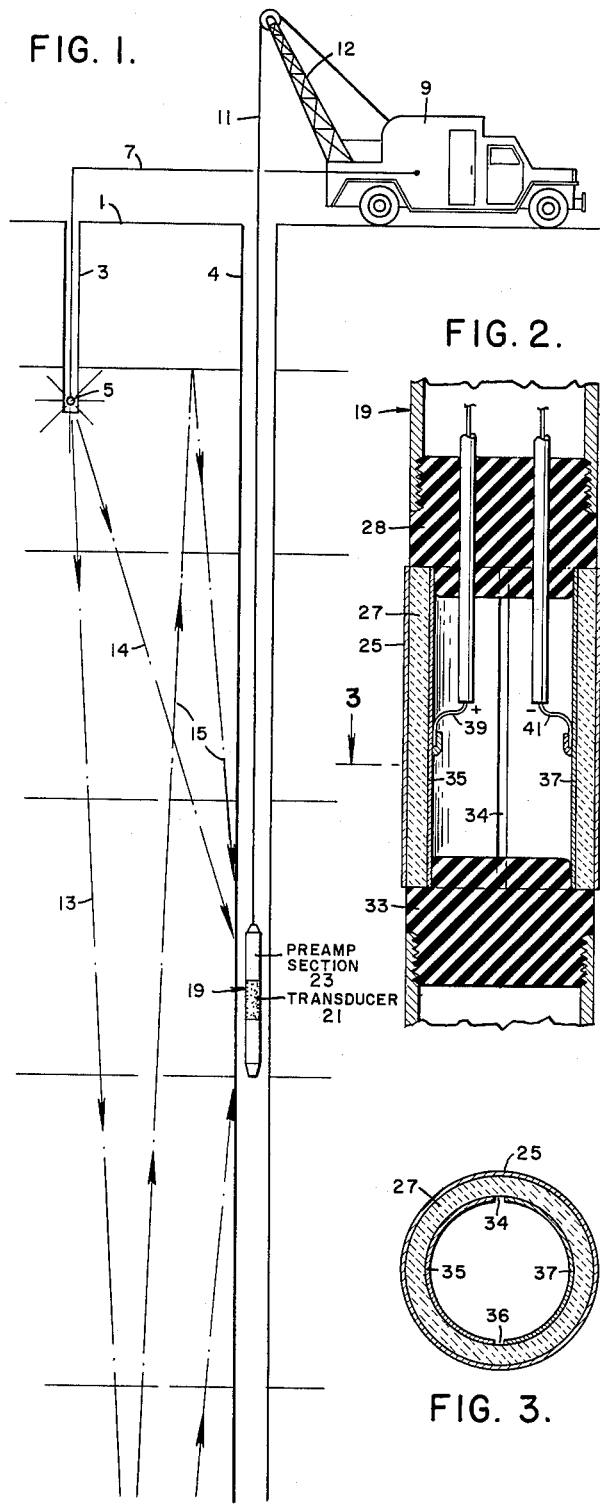
March 15, 1966 — J. D. BALL ET AL — 3,240,288
APPARATUS FOR SEISMIC PROSPECTING
Filed June 11, 1962
INVENTORS.
JOHN D. BALL,
CHARLES J. CHARSKE,
BY John B. Davidson
ATTORNEY.

3,240,288
APPARATUS FOR SEISMIC PROSPECTING
John D. Ball and Charles J. Charske, Houston, Tex., assignors, by mesne assignments, to Esso Production Research Company, Houston, Tex., a corporation of Delaware
Filed June 11, 1962, Ser. No. 201,493
4 Claims. (Cl. 181—.5)

This invention relates to geophysical prospecting apparatus, and more particularly to apparatus for detecting seismic waves at various depths in a borehole and for transmitting to the earth's surface electrical signals produced by detecting the seismic waves.

In reflection seismic surveying, seismic waves are initiated at or near the earth's surface by various techniques such as detonating a dynamite charge, dropping a heavy weight, or energizing an electroacoustic transducer. A portion of the waves produced by impulsing the earth travel downwardly through the earth and encounter various reflecting horizons between successive subsurface strata of different physical properties, and are partially reflected upwardly. The reflected waves, along with other waves produced by the seismic impulse, are detected at a plurality of detecting locations linearly disposed on the earth's surface with respect to the location whereat the earth is impulsed. From the record of such detected seismic waves, commonly termed a seismogram, much information can be derived relative to the structure of the earth.

In order to make maximum use of the information of the seismogram, it is necessary to know to some degree of accuracy certain of the properties of the subsurface strata through which the seismic waves travel. For example, it is extremely helpful to know at least approximately the velocity at which seismic waves are propagated at various depths in the earth in any given area. One technique that has been used to determine such information has been termed "well shooting." In accordance with this technique it is customary to lower a seismic wave detector, or geophone, into the well on a multiconductor cable and to record on a timed strip chart or tape the instant of production of the seismic impulse, along with the ensuing signals that are detected by the geophone. From such a record a geophysicist may be able to determine the vertical travel time of seismic waves from the level at which the earth was impulsed, to the geophone level. By making such time measurements at a number of levels in the well, the velocity of propagation of seismic waves through earth strata, along with other information relative to the strata, may be ascertained.

Oftentimes it has been exceedingly difficult, if not impossible, to obtain any information at all from a record obtained by shooting a well because of the presence on the record of other signals which are termed "noise." One serious type of noise is ascribed to electrical ground currents, particularly 60 cycle currents. Such currents mix with the signal currents generated by the detector in response to seismic waves, and the two currents are often very difficult to separate because of their overlapping frequency content. In the past, attempts have been made to improve the signal-to-noise ratio by techniques such as the use of larger explosive charges to produce seismic waves and by the use of a preamplifier down the hole with the geophone to amplify the geophone signal before it becomes mixed with noise. Attempts also have been made to shield the cables and to fabricate the conductors in such a manner that they are well balanced with respect to ground. Various remedial measures that have been taken in the past have been generally unsatisfactory, so that the results of well shooting are unpredictable at best.

In accordance with the present invention there is provided transducer means adapted to produce signals 180° out of phase. When a seismic wave impinges thereon, two transducers of opposite polarity may be used. Preferably, there is provided a transducer utilizing a tubular sleeve of ferroelectric, polycrystalline dielectric material, such as barium titanate or lead barium titanate. The tubular sleeve is provided with an outer electrode on the outer surface thereof, and spaced apart electrodes on the inner surface of the sleeve and within the outer electrode. The inner electrodes of the transducer are connected to a pair of conductors of a multiconductor cable, and the outer electrode is connected to a third conductor which may be the shield of the cable, by means of amplifiers characterized by a high input impedance and a low output impedance. The amplifiers are supplied with power from the other end of the cable through the same conductors which carry the signals from the amplifiers to the other end of the cable. The circuit terminating the cable is balanced so that the effect of any A.C. field influencing the cable is cancelled, leaving only the amplifier signals transmitted through the cable.

Objects and features of the invention not apparent from the above discussion will become evident upon consideration of the following detailed description thereof taken in connection with the accompanying drawing, wherein:

FIG. 1 is a schematic diagram illustrating the seismic well shooting technique utilizing apparatus in accordance with the present invention;

FIG. 2 is a cross-sectional view of a portion of the sonde 19 illustrated in FIG. 1;

FIG. 3 is a cross-sectional view taken along section 3—3 of FIG. 2; and

FIG. 4 is an electrical schematic diagram of apparatus in accordance with the invention illustrating a preferred embodiment thereof.

With reference now to FIG. 1, there is illustrated a shot hole 3 extending from the earth's surface to below the weathering layer of the earth, and a deep well 4 extending from the earth's surface 1 through a plurality of earth formations. A truck 9 for carrying geophysical apparatus is provided with a boom 12 from which a sonde 19 is suspended in well 4 on logging cable 11. The logging cable may be the type of cable such as is ordinarily used in connection with the electrical logging of boreholes. The cable may be provided with a multiplicity of conductors, one of which may be a cable shield or electrically conductive sheath. A seismic charge 5 is illustrated as having been placed in the bottom of shot hole 3 and connected to apparatus including an electrical source in the truck 9 by conductor 7 so as to be detonated by an electrical signal through conductor 7.

The sonde 19 may comprise a plurality of housing sections, and is here shown as including a transducer section 21 and a preamplifier section 23. The transducer section utilizes a tubular transducing element 27 constructed of a ferroelectric, polycrystalline dielectric material, such as lead-barium titanate (high temperature type), which has located on its entire outer surface a metal sleeve or conducting layer 25. Located on the inner surface of the transducing element 27 are two electrodes 35 and 37 which are insulatively spaced apart. The inner electrodes are illustrated most perspicuously in FIG. 3 as being semicylindrical in shape and as being spaced apart by longitudinal slots 34 and 36 therebetween. Alternatively, the electrodes may be in the form of metallic layers covering the entire inner surface of the transducing element 27 except for a narrow ring extending around the inner surface of the transducing element 27 substantially midway between the ends thereof. End plugs 28 and 33 are connected to the ends of transducing element 27 and are formed of an insulating material such as hard rubber. Holes extend through end plug 28 to accommodate electrical conductors 39 and 41, which are respectively connected at their lower ends to electrodes 35 and 37. The electrical conductors 39 and 41 extend through the plug 28 into the preamplifier section 23 of sonde 19.

The transducing element 27 may be activated by means known to the prior art such that the portions of the transducing element on the opposite sides of slots 34 and 36 are oppositely polarized. It is known in the art that transducing material, such as barium titanate, may be treated to exhibit piezoelectric properties by temporarily subjecting the material to a polarizing unidirectional electric field either at room temperature or while the material is being cooled through its Curie point. Inasmuch as this is a well known technique, it will not be further discussed herein.

As illustrated in FIG. 4, the transducer electrodes 35 and 37 are connected by conductors 39 and 41 to a pair of electrical amplifiers having a high input impedance and a low output impedance. Electrode 25 is connected to ground, which may be the sheath of cable 11, by another electrical conductor (not shown).

The amplifiers in preamplifier 23, to which electrodes 35 and 37 are connected, are identical and the component parts thereof are designated by reference numerals differing only by subscript letters $a$ and $b$. Only one of the amplifiers will be hereinafter described. It is sufficient to say here that one amplifier connects electrode 35 to electrical conductor 61a of shielded cable 11, and that the other amplifier connects electrode 37 to conductor 61b of shielded cable 11. The first-named amplifier comprises three transistors 45a, 47a, and 59a which are of the same conductivity type and are here shown as being of the NPN type. The transistors are arranged in the Darlington configuration described in U.S. Patent No. 2,663,806. In this configuration the collectors of transistors 45a and 47a are directly connected together, and the emitters of transistors 45a and 47a are directly connected to the base electrodes of transistors 47a and 59a, respectively. In the usual Darlington configuration the collector of transistor 59a will also be directly connected to the collectors of transistors 45a and 47a. In the preferred embodiment of the invention shown in FIG. 4, the collector of transistor 59a is connected to the collectors of the other transistors by a resistor 55a, and a semiconductor diode is connected from the collectors of transistors 47a and 45a to the emitter of transistor 59a. For the purpose of adjusting the bias on the base electrode of transistor 45a, there is provided a resistor 51a connected between the base and collector of transistor 45a, and a resistor 53a connected between the base of transistor 45a and the emitter of transistor 59a. The output of the amplifier is taken between the emitter and collector of transistor 59a. The emitter of transistor 59a is directly connected to conductor 61a, while the collector is directly connected to the shield 61c of cable 11.

At the opposite end of the cable there is provided a voltage source 63, the positive terminal of which is connected to shield 61c, and the negative terminal of which is connected to a resistor 65. Connected between the conductors 61a and 61b are a pair of series-connected resistors 67 and 69, which may be adjustable, the juncture of which is connected to the end of resistor 65 opposite voltage source 63. As shown in FIG. 4, a potentiometer may be used, the end terminals being connected to conductors 61a and 61b, and the variable tap connected to resistor 65. The output of the system is taken across the resistors 67 and 69 and is recorded on a conventional geophysical recorder 71. The geophysical recorder 71 may include a switch for connecting an electrical source (not shown) to electrical conductor 7 (see FIG. 1) for providing electrical current to detonate seismic charge 5, in the usual manner.

At this point it is desirable to expand on certain of the features of the electrical circuit described above. The function of the resistor 55a and semiconductor diode 57a is to minimize a type of noise prevalent in transistors in the frequency range up to about 1,000 c.p.s., which is known as "semiconductor noise." This noise is of random occurrence in amplitude and phase, with a frequency amplitude spectrum that varies according to the approximate function $1/f$. The exact nature of this noise is not understood, but it is known that there is a correlation between leakage current and the amount of noise that is present. It has been found that there is an independent optimum collector-to-base voltage and collector current at which the noise is minimum. The exact values of optimum voltage and current for any particular transistor will vary from transistor to transistor, but the noise minimum usually occurs over a broad range of collector-to-base voltages and collector currents for any one type of transistor, thus allowing selected low noise operating conditions. Inasmuch as a PN junction exhibits an essentially constant voltage drop thereacross, the diode 57a functions to hold the D.C. voltage at a value whereat the semiconductor noise is minimized. The values of resistors 51a and 53a are also chosen to give an optimum collector current for further reduction of semiconductor noise. The values of the resistors 51a and 53a should be low compared to leakage current paths to provide satisfactory operation at high temperatures.

The diode 57a has an additional function in preventing the amplifier output signal from appearing across the equivalent transistor comprising transistors 45a and 47a. By taking advantage of the constant voltage drop of a PN junction, the signal from the emitter of transistor 59a is referred to the collectors of transistors 45a and 47a. Thus, no signal voltage is present across the combination, and the input impedance is not lowered due to the presence of resistors 51a and 53a.

The gain of the amplifier can be adjusted by varying the values of resistors 67 and 69. Preferably, the value of resistor 65 should be as large as possible with respect to the combined resistance of resistors 67 and 69 to provide maximum common mode injection, but small enough to pass a desired output current. The resistors 67 and 69 further should be as nearly as possible equal in resistance. Inasmuch as the amplifiers described are current-sensitive devices, it can be seen that common mode input voltages do not cause large currents in the output due to the effect of resistor 65 in rejecting common mode signals. Resistors 67 and 69 may be adjusted at the surface to obtain the desired balance. Common mode signals are equal and of the same sign at both inputs and, therefore, may be canceled. The desired signal is equal and opposite in polarity, or unbalanced.

When electrical conductor 7 is energized from recorder 71, seismic charge 5 is detonated. The resulting seismic waves will follow a plurality of ray paths such as those designated by reference numerals 13, 14, and 15. The seismic waves will be detected by the transducer 21, and equal and opposite voltages will appear at electrodes 35 and 37 with respect to electrode 25. The alternating current signals produced thereby are amplified by the respective amplifiers connected thereto and are transmitted to the resistance network comprising resistors 67, 69, and 65. The amplified signals produced by the transducer will appear across the resistors 67 and 69 and will be recorded by recorder 71. Any signals appearing on conductors 61a and 61b as a result of the influence of stray fields will be balanced out across resistors 67 and 69 so that no net voltage will appear across the resistors. (This is also due to the low output impedance.)

From the above it can be seen that there has been provided a system for detecting seismic waves down a borehole and for transmitting electrical signals to the earth's surface wherein alternating current fields influencing a conductor cable extending from the geophone location to the earth's surface do not produce voltages at the output of a system, and the internal amplifier noise is made minimum. Inasmuch as the maximum voltage gain of the amplifiers described is approximately unity, it is possible to handle input signals from the microvolt level to 10 volts or more with only a modest surface voltage supply. Inasmuch as total load current is only a few milliamperes, there is no problem posed by the low current carrying capacity of logging cable conductors. A paramount advantage of the system is that it is possible to locate the supply voltage at the surface end of the cable, thus presenting no weight problem or operating problems with regard to the power supply. Additionally, the gain and balance of the amplifiers can be controlled from the surface to provide optimum operation conditions.

The invention is not to be restricted to the specific structural details, arrangement of parts, or circuit connections herein set forth, as various modifications thereof may be effected without departing from the spirit and scope of the invention.

The objects and features of the invention having been completely described, what we wish to claim is:

1. Apparatus for detecting acoustic waves in a well and transmitting electrical signals produced thereby to the earth's surface, comprising:
   a housing;
   a pressure-sensitive geophone carried by said housing including a tubular ferroelectric polycrystalline dielectric member, a cylindrical outer electrode on said tubular member, and first and second inner electrodes within said tubular member and said outer electrode, insulatively spaced apart from each other, said tubular member being polarized to produce electrical voltages of opposite polarity relative to said outer electrode upon impingement of acoustic waves on said geophone;
   a logging cable connected to said housing, including at least first, second, and third electrical conductors;
   first and second amplifiers, each having high impedance input circuits connected to said first and second inner electrodes respectively, and low impedance output circuits connected between said first and third, and said second and third conductors, respectively;
   at the end of said logging cable opposite said housing, first and second resistor means of substantially equal resistance, serially connected between said first and second conductors, and serially connected third resistance means and current source means connecting said third conductor to the juncture of said first and second resistor means.

2. Apparatus for detecting acoustic waves in a well and transmitting electrical signals produced thereby to the earth's surface, comprising:
   a housing;
   a pressure-sensitive geophone carried by said housing including a tubular ferroelectric polycrystalline dielectric member, a cylindrical outer electrode on said tubular member, and first and second inner electrodes within said tubular member and said outer electrode, insulatively spaced apart from each other, said tubular member being polarized to produce electrical voltages of opposite polarity relative to said outer electrode upon impingement of acoustic waves on said geophone;
   a logging cable connected to said housing, including at least first, second, and third electrical conductors;
   first and second amplifiers each comprising three transistors of the same conductivity type, each transistor including an emitter, a collector, and a base, means directly connecting together the collectors of said first and second transistors, resistor means connecting the collector of the third transistor to the collectors of the first and second transistors, means connecting the base of the second transistor to the emitter of the first transistor, means connecting the base of the third transistor to the emitter of the second transistor, and means, including a PN juncture diode having a substantially constant voltage drop thereacross, connected between the collector of said first and second transistor means and the emitter of said third transistor means, for regulating the direct current emitter collector voltage of said first and second transistors;
   the first transistor base electrodes of said first and second amplifiers being respectively connected to said first and second inner electrodes of said geophone;
   the third transistor collector electrodes of said first and second amplifiers being connected to said third electrical conductor;
   the third transistor emitter electrodes of said first and second amplifiers being respectively connected to said first and second electrical conductors; and
   at the end of said logging cable opposite said housing, first and second resistor means of substantially equal resistance, serially connected between said first and second conductors; and serially connected third resistance means and current source means connected between said third conductor to the juncture of said first and second resistor means.

3. Apparatus for detecting acoustic waves in a well and transmitting electrical signals produced thereby to the earth's surface, comprising:
   a housing;
   a pressure-sensitive geophone carried by said housing including a tubular ferroelectric polycrystalline dielectric member, a cylindrical outer electrode on said tubular member, and first and second inner electrodes within said tubular member and said outer electrode, insulatively spaced apart from each other, said tubular member being polarized to produce electrical voltages of opposite polarity relative to said outer electrode upon impingement of acoustic waves on said geophone;
   a logging cable connected to said housing, including at least first, second, and third electrical conductors;
   first and second amplifiers, each having high impedance input circuits connected to said first and second inner electrodes respectively, and low impedance output circuits connected between said first and third, and said second and third conductors, respectively; and
   means connected to said first, second, and third conductors at the end of said logging cable opposite said housing for presenting a balanced alternating current load between said first and second conductors, and said third conductors, and for electrically energizing said first and second conductors to substantially the same direct current potential relative to said third conductor.

4. Apparatus for detecting acoustic waves in a well and transmitting electrical signals produced thereby to the earth's surface, comprising:
   a housing;
   a pressure-sensitive geophone carried by said housing including a tubular ferroelectric polycrystalline dielectric member, a cylindrical outer electrode on said tubular member, and first and second inner electrodes within said tubular member and said outer electrode, insulatively spaced apart from each other, said tubular member being polarized to produce electrical voltages of opposite polarity relative to said outer electrode upon impingement of acoustic waves on said geophone;

a logging cable connected to said housing, including at least first, second, and third electrical conductors;

first and second transistor amplifiers in Darlington configuration connecting said first and second inner electrodes respectively to said first and third, and said second and third conductors, respectively;

at the end of said logging cable opposite said housing, means for varying the gain of said amplifier including first and second resistor means of substantially equal resistance, serially connected between said first and second conductors, and serially connected third resistance means and current source means connecting said third conductor to the juncture of said first and second resistor means.

References Cited by the Examiner

UNITED STATES PATENTS

| | | | |
|---|---|---|---|
| 2,663,806 | 12/1953 | Darlington | 330—32 X |
| 2,742,614 | 4/1956 | Mason | 340—10 |
| 2,760,181 | 8/1956 | Camp | 340—10 |
| 2,783,449 | 2/1957 | Loofbourrow | 340—17 |
| 2,788,510 | 4/1957 | Howes | 340—17 |
| 2,860,193 | 11/1958 | Lindsay | 330—13 |

BENJAMIN A. BORCHELT, *Primary Examiner.*

CHESTER L. JUSTUS, *Examiner.*